United States Patent [19]

Heckel et al.

[11] 4,083,242

[45] Apr. 11, 1978

[54] DEVICE FOR MEASURING THE FLOW RATE OF FLUID IN A DUCT

[75] Inventors: Alain Heckel, Chabeuil; Rene Presset, Portes les Valence, both of France

[73] Assignee: Crouzet, Paris, France

[21] Appl. No.: 760,578

[22] Filed: Jan. 19, 1977

[51] Int. Cl.² .............................................. G01F 1/32
[52] U.S. Cl. ................................................. 73/194 B
[58] Field of Search ........................... 73/194 B, 194 C

[56] References Cited

U.S. PATENT DOCUMENTS 3,279,251  10/1966  Chanaud ................................. 73/194
3,481,196  12/1969  Rodely .................................... 73/194 X Primary Examiner—Herbert Goldstein
Attorney, Agent, or Firm—Holman & Stern

[57] ABSTRACT

Device for measuring the volumetric flow rate of a fluid flowing through a generally tubular body, wherein a swirling motion is imparted to the fluid by a precessing means, comprising a device producing a variable frequency signal depending on the precession motion of the fluid, associated with a logical means arranged for correcting said frequency, characterized in that the precessing means comprises in succession, in the flowing direction of the fluid, a first cylindrical duct communicating with a converging cylindrical-conical axial chamber through a second duct the axis of which is displaced and inclined in relation to the axis of said chamber, the latter communicating co-axially with a cylindrical terminal duct through a third cylindrical duct of restricted diameter connected to said terminal duct by a diverging conical enlargement.

8 Claims, 3 Drawing Figures

DEVICE FOR MEASURING THE FLOW RATE OF FLUID IN A DUCT

BACKGROUND OF THE INVENTION

The present invention relates to a volumetric flow measuring device, and more particularly to swirl flow type of flow meter.

The flow measuring problem has been solved, to this day, by using very diversified techniques, mechanical as well as electro-mechanical or electronic.

Amongst the best known flow-meters, may be cited the turbine flow-meters, the pressure difference measuring flow-meters, the ultrasonic flow-meters, the electromagnetic flow-meters. All the proposed solutions display at least one of the following disadvantages:

a frictional force and wear due to the existence of mobile mechanical parts; the result is non linearity of the device response due to the absence of knowledge about and the non-stability of the frictional forces, the latter making the instrument also often unusable for measuring gas flows, as well as a decrease of the performance as time goes due to the wear of the mobile mechanical parts;

the necessity of a stream flowing in well defined conditions, a modification of said conditions (turbulent or laminar flow) having an influence, for instance, in the case of a turbine flow-meter, on the linearity of the device, and the non-uniformity of the profile of the flow speeds in the duct of the measuring device leading to important errors in the differential pressure measuring devices;

limitation in the range of use, devices operating with pressure differences being not usable for low flows rates;

high influence of the problem of deposits and cavitation on the quality of the measures;

relatively long response time (differential pressure or turbine flow-meters);

output signal in analog form not very compatible with remote transmissions;

operating difficulty, the ultra-sound and the electromagnetic flow-meters requiring the use of a complicated and cumbersome equipment involving an increased risk of failures, higher costs, more difficult repairs and a higher energy consumption;

difficulty in exploiting the measure, the information relative to the flow measured with differential pressure flow-meters being obtained from the measurement of a pressure difficult to carry into effect;

importance of the nature of fluid, the use of an electro-magnetic flow-meter requiring a good knowledge and a good stability of the conducting properties of the liquid.

In order to eliminate these disadvantages, there has been already proposed numerical devices for measuring the volumetric flow of fluid flowing through a generally tubular body, in which a swirl is generated by a swirling fluide precessing means, comprising means producing a variable frequency signal depending on the precession movement of the fluid, associated with a logic system arranged for conditioning said frequency.

The latter devices in which body the flux pressure and speed may vary periodically at all points of the wall of said body are indeed usable for any homogeneous fluid in whatever flowing conditions; they comprise no mobile mechanical parts and may guarantee a good testing stability in time; they may operate within a wide range of flow rates and they supply a numerical signal suitable for remote transmission.

But the construction of such devices is often delicate and requires a too high accuracy for the execution of the shapes. On the other hand, the form of the means producing the variable frequency signal does not always allow an optimal exploitation of its signals.

SUMMARY OF THE INVENTION

The object of the present invention is therefore to provide a device of simple construction with a rigorously linear response curve and a short response time, and relates accordingly to a numerical measuring device for measuring the volumetric flow rate of a fluid flowing through a generally tubular body, wherein a swirling motion is imparted to the fluid by a precessing means, comprising a device producing a variable frequency signal depending on the precession motion of the fluid, associated with a logic system arranged for conditioning said frequency, characterized in that the precessing means comprises in succession, in the flowing direction of the fluid, a first cylindrical duct provided with a filter, a second cylindrical duct of restricted cross-sectional area, a chamber comprising a cylindrical portion of enlarged cross-sectional area also converging conical part the axis of said second duct being displaced and inclined relative to the axis of said chamber, in order to cause the fluid to swirl at the outlet of said chamber a third cylindrical duct of restricted cross-sectional area co-axial with said chamber, and a fourth cylindrical duct provided with means arranged for stopping the swirling motion of the fluid, but connected to said third duct by a tapered wall in order to cause the fluid to swirl.

BRIEF DESCRIPTION OF THE DRAWINGS

The invention will become more apparent from the following description of one preferred embodiment of the device according to the invention, as shown in the accompanying drawing wherein.

DETAILED DESCRIPTION OF A PREFERRED EMBODIMENT

Figure 1:
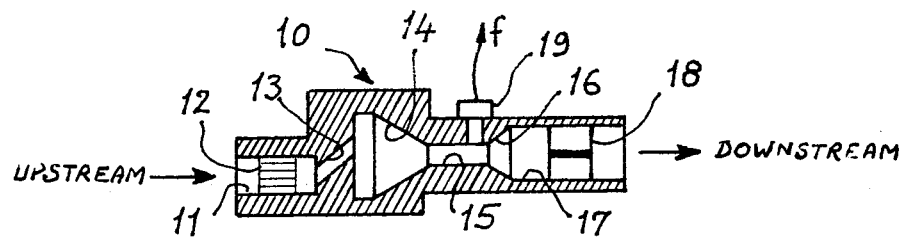
FIG. 1 is a view of the mechanical part of the device of the invention, or flow-meter.

FIG. 1 shows the mechanical part 10 of the flow metering device, or flow-meter, whose body is realized in conventional fashion, for instance by casting or molding.

Flow-meter 10 comprises a swirling means, in which the fluid entering via a duct 11 is deviated by a duct 13 and penetrates a cylindrical-conical chamber 14 with a determined incidence in relation to the axis of the latter, thus causing at the outlet of chamber 14 the fluid to swirl:

a staged duct generally diverging, made of two successive cylindrical ducts 15 and 17 of different diameters and connected by a tapered wall 16;

an anti-swirling means 18 made of a fixed cross-piece for stopping the swirling movement of the fluid;

a filter 12, which may be a fixed bunch of small parallel ducts, mainly intended to stop the impurities carried by the fluid and accessorily to correct the eventual perturbations which may affect the flux upstream of the flow-meter, and a sensor 19 and members required for the processing of the signals supplied by sensor 19.

Figure 2:
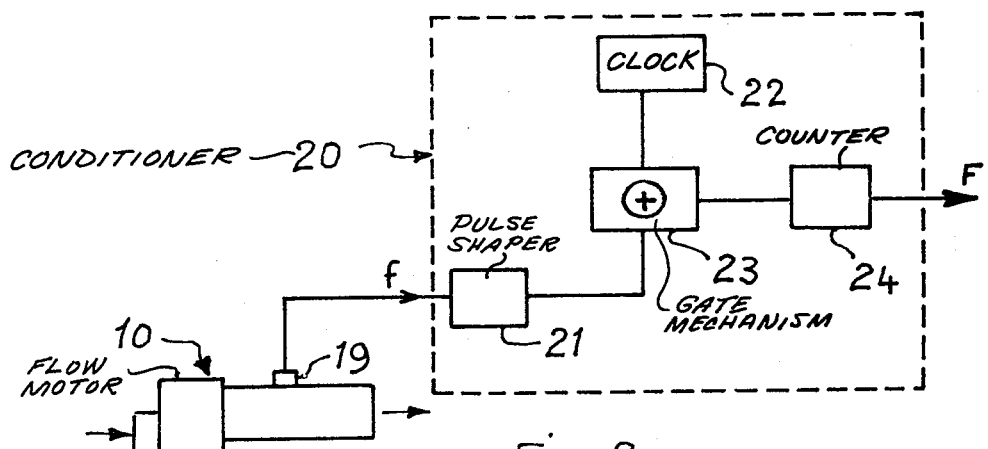
FIG. 2 is a schematic view of the flow metering device of the invention.

FIG. 2 is a schematic view of the flow metering device according to the invention. A sensor 19 mounted on the body of flow-meter 10 delivers a periodical electric signal 3.1 (FIG. 3) of variable frequency $f$ related linearly to the flow according to law $$f = k_o D - k_1$$

$k_o$ and $k_1$ being two positive constants.

A pulse conditioner 20 produces from frequency $f$ a frequency F directly proportional to the flow D, with a suitable scale factor.

Figure 3:
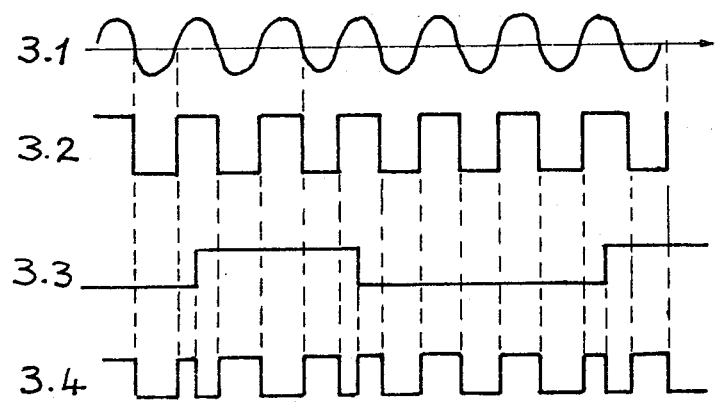
FIG. 3 is a chart of the various electric signals produced by the device of the invention.

Conditioner 20 comprises a pulse shaper 21 which, from signal 3.1 supplied by sensor 19, produces a square wave signal 3.2, whereas a clock 22 supplies another periodical square wave signal 3.3 (FIG. 3). The function of a gating mechanism 23 is to carry out the "OR exclusive" operation from signals 3.2 and 3.3 respectively supplied by pulse shaper 21 and clock 22, signal 3.4 thus formed being at logic level 1 when one and one only of signals 3.2 and 3.3 is at logic level 1. The function of frequency counter 24 known in the art is to carry out the numerical evaluation of the average frequency F of the signal 3.4 delivered by circuit 23.

The speed or pressure variations of the swirling flux do not appear very clearly and are only detectable when the geometrical and structural characteristics of the flow-meter 10 combine the following technological conditions:

the inclination angle of duct axis 13 of the swirling means on the base of the cylindrical part of chamber 14 is comprised between 40° and 50°; the convergence angle of the conical part of chamber 14 connected to duct 15 is comprised between 45° and 55°; the diameter of the cylindrical part of chamber 14 is equal to the double of that of duct 15 which follows it;

the shape of duct 15 is cylindrical with circular cross-section, the ratio of its length to its diameter being comprised between one and two;

sensor 19 is situated normally to duct axis 15, the projection of the axis of sensor 19 on the base of the cylindrical part of chamber 14 forming an angle comprised between 120° and 130° with the radius of the circular base of chamber 14 crossing the center of the opening through which duct 13 enters chamber 14;

the sensitive extremity of sensor 19 penetrates the inside of duct 15 on a distance comprised between the tenth and the twentyeth part of the diameter of duct 15.

What we claim is:

1. A device for measuring the volumetric flow rate of a fluid flowing through a generally tubular body, wherein a swirling or precessing motion is imparted to the fluid comprising in succession, in the flowing direction of the fluid, a first cylindrical duct provided with a filter, a second cylindrical duct of restricted cross-sectional area, a chamber comprising a cylindrical part of enlarged cross-sectional area and a converging conical part, the axis of said second duct being displaced and inclined relative to the axis of said chamber in order to cause the fluid to swirl or precess at the outlet of said chamber, a third cylindrical duct of restricted cross-sectional area coaxial with said chamber, and a fourth cylindrical duct provided with means arranged for stopping the swirling motion of the fluid, but connected to said third duct by a tapered wall, means responsive to the precession of said fluid and producing a variable frequency signal.

2. A device according to claim 1, wherein the inclination angle of axis of the second duct on the base of the cylindrical part of the chamber is comprised between 40° and 50°.

3. A device according to claim 1, wherein the diameter of the cylindrical part of the chamber is the double of that of the third cylindrical duct.

4. A device according to claim 1, wherein the convergence angle of the conical part of the chamber connected to the third cylindrical duct is comprised between 45° and 55°.

5. A device according to claim 1, wherein the ratio of the length of the third cylindrical duct to its diameter is comprised between one and two.

6. A device according to claim 1, comprising a fluid pressure or speed sensor, producing the variable frequency signal, situated normally to the axis of the third cylindrical duct, wherein a projection of the axis of said sensor on the base of the cylindrical part of the chamber forms an angle comprised between 120° and 130° with the radius of said base crossing the center of the opening through which the second duct emerges into said chamber.

7. A device according to claim 6, wherein the sensitive extremity of the sensor penetrates inside of the third cylindrical duct on a distance comprised between the tenth and the twentyeth part of the diameter of said duct.

8. A device according to claim 1, including a square wave generating trigger supplying a constant frequency signal, a pulse shaper for transforming said variable frequency signal to a square-wave signal and a gating mechanism of the "OR exclusive" type, calculating the sum of said constant frequency and variable frequency signals, a signal resulting from said summation being applicable to a frequency counter carrying out the numerical evaluation of the average frequency of said resulting signal.

* * * * *

UNITED STATES PATENT AND TRADEMARK OFFICE
CERTIFICATE OF CORRECTION

PATENT NO. : 4,083,242
DATED : April 11, 1978
INVENTOR(S) : Alain Heckel, et al

It is certified that error appears in the above-identified patent and that said Letters Patent are hereby corrected as shown below:

[30] Foreign Priority Data

France No. 76.02509 of January 28, 1976

Signed and Sealed this

Seventeenth Day of October 1978

[SEAL]

Attest:

RUTH C. MASON
*Attesting Officer*

DONALD W. BANNER
*Commissioner of Patents and Trademarks*